United States Patent [19]
Kraemer et al.

[11] Patent Number: 5,798,706
[45] Date of Patent: Aug. 25, 1998

[54] DETECTING UNAUTHORIZED NETWORK COMMUNICATION

[75] Inventors: Jeffrey A. Kraemer, Northborough, Mass.; Alan J. Kirby, Hollis, N.H.; David C. Waterman, Leominster, Mass.

[73] Assignee: Raptor Systems, Inc., Waltham, Mass.

[21] Appl. No.: 665,293

[22] Filed: Jun. 18, 1996

[51] Int. Cl.$^6$ .................. G05B 23/02; G06F 15/00; G06G 7/00
[52] U.S. Cl. ............... 340/825.07; 370/401; 395/187.01; 340/825.06
[58] Field of Search ............. 340/825.06, 825.07; 370/252, 401, 402; 395/186, 187.01, 287

[56] References Cited

U.S. PATENT DOCUMENTS

| | | | |
|---|---|---|---|
| 5,414,833 | 5/1995 | Hershey et al. | 395/186 |
| 5,479,612 | 12/1995 | Kenton et al. | 395/186 |
| 5,537,099 | 7/1996 | Liang | 340/825.07 |
| 5,550,984 | 8/1996 | Gelb | 395/187.01 |
| 5,557,742 | 9/1996 | Smaha et al. | 395/186 |
| 5,581,559 | 12/1996 | Crayford et al. | 395/186 |
| 5,606,668 | 2/1997 | Shwed | 395/186 |
| 5,623,601 | 4/1997 | Vu | 395/187.01 |

*Primary Examiner*—Brian Zimmerman
*Assistant Examiner*—Edward Merz
*Attorney, Agent, or Firm*—Fish & Richardson P.C.

[57] ABSTRACT

Back door packet communication between a workstation on a network and a device outside the network is identified by detecting packets that are associated with communication involving devices outside the network, and identifying packets, among those detected packets, that are being sent or received by a device that is not authorized for communication with devices outside the network.

19 Claims, 4 Drawing Sheets

DETECTING UNAUTHORIZED NETWORK COMMUNICATION

BACKGROUND

This invention relates to detecting unauthorized network communication.

Figure 1:
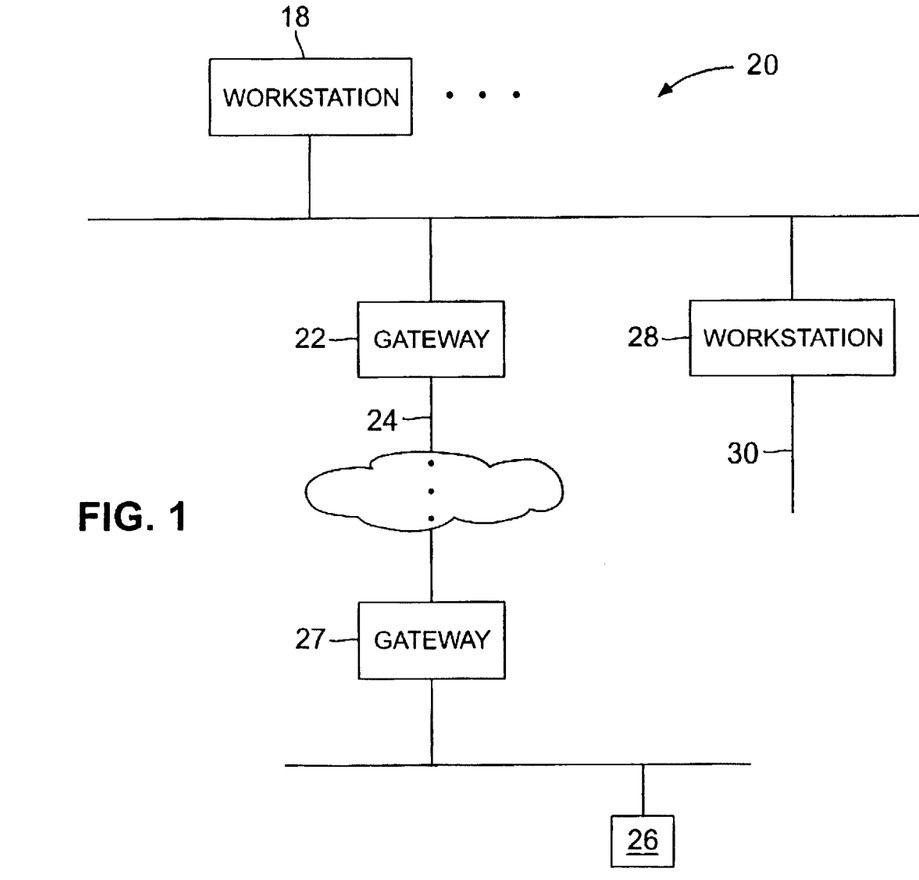
FIGS. 1 and 2 are block diagrams of a network.

As seen in FIG. 1, workstations 18 in an internal local area network (LAN) 20 may communicate with the world outside the LAN via authorized gateways 22 that are connected, on one hand, to the LAN, and, on the other hand, to a dedicated or dial-up telephone line 24. The gateways may be set up to prevent unauthorized communication between the LAN workstations and devices located outside the LAN (e.g., a device 26 connected to another LAN which is reached via another gateway 27). Unauthorized communication may still occur inadvertently or intentionally when a LAN workstation 28 is connected directly to the outside world. The same is true in situations where a LAN has no authorized gateway to the outside world.

For example, a LAN workstation that includes a modem hooked to a outside telephone line 30, may serve as an unauthorized "back door" that may pass packets back and forth between the outside telephone line and the LAN. To eliminate back door communication, LAN administrators sometimes make a physical inventory of workstations to determine whether any of them are connected to the outside world by a path other than through the authorized gateways.

Figure 3:
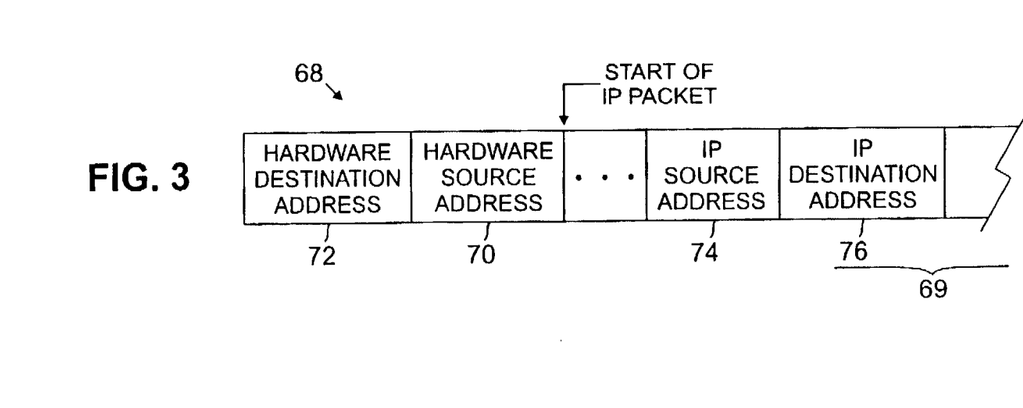
FIG. 3 is a diagram of a portion of a packet.

Referring also to FIG. 3, a packet constructed in accordance with the so-called internet protocol (IP) protocol includes an IP portion 69. The IP portion has an IP source address 74 which identifies the source device, and an IP destination address 76 which identifies the target device. While the packet is being communicated within an internal network, the packet also includes a hardware destination address 72 (e.g., the hardware address of a network interface card, or NIC) which identifies a destination device within the network by an address that is unique at least within the internal network.

Referring again to FIG. 1, a packet sent by workstation 18 includes the IP address of workstation 18 as the IP source address and the IP address of the target device as the IP destination address. If the target device is within the internal network, the hardware address of the target device is included as the hardware destination address 72. If the target device is not on the internal network, for example device 26, the hardware address of the NIC in gateway 22 is included as the hardware destination address. In this latter case, the gateway removes the hardware addresses from the packet and forwards it to gateway 27. Gateway 27 adds to the packet the hardware address of device 26 as the hardware destination address 72.

SUMMARY

In general, in one aspect, the invention is used with devices that are coupled by a communication medium to form an internal packet network, at least one of the devices not being an authorized conduit for communication with external devices that are not part of the internal packet network. In the invention, packets are observed while passing on the medium. Based on the observation, packets associated with communication with an external device are detected. For detected packets associated with communication with an external device, a determination is made (e.g., by examining hardware addresses in the packets, or watching for packets indicating that a non-authorized device is advertising routes, or watching for redirect messages being sent by a non-authorized device) whether or not the communication is authorized.

Other aspects and features of the invention include the following. The detecting includes comparing address information in the packets (e.g., logical network addresses, such as IP addresses) with address information associated with devices that are part of the internal packet network to determine if the packet involves communication only between devices that are part of the internal packet network. The address information associated with devices that are part of the internal packet network is stored in a look-up table.

The hardware addresses that are examined are hardware addresses of network interface cards. The address information that is used for comparison is address information (stored in a look-up table) of devices that are authorized conduits for communication with external devices.

The packets are stored temporarily in a look-ahead buffer. Information about the non-authorized communication is reported for use by another process, which may, e.g., raise an alarm or obstruct the passage of the non-authorized packet.

In an internal packet network of the kind in which none of the devices are authorized conduits for communication with external devices, an event may be logged with respect to packets intended for communication with an external device even without checking the hardware addresses in the packets.

Among the advantages of the invention are that back door communication may be effectively identified in a simple way. The system works automatically. The scanner may be a passive device. The tables may be built easily without requiring a detailed knowledge of hardware addresses.

Other advantages and features will become apparent from what follows.

DESCRIPTION

Figure 2:
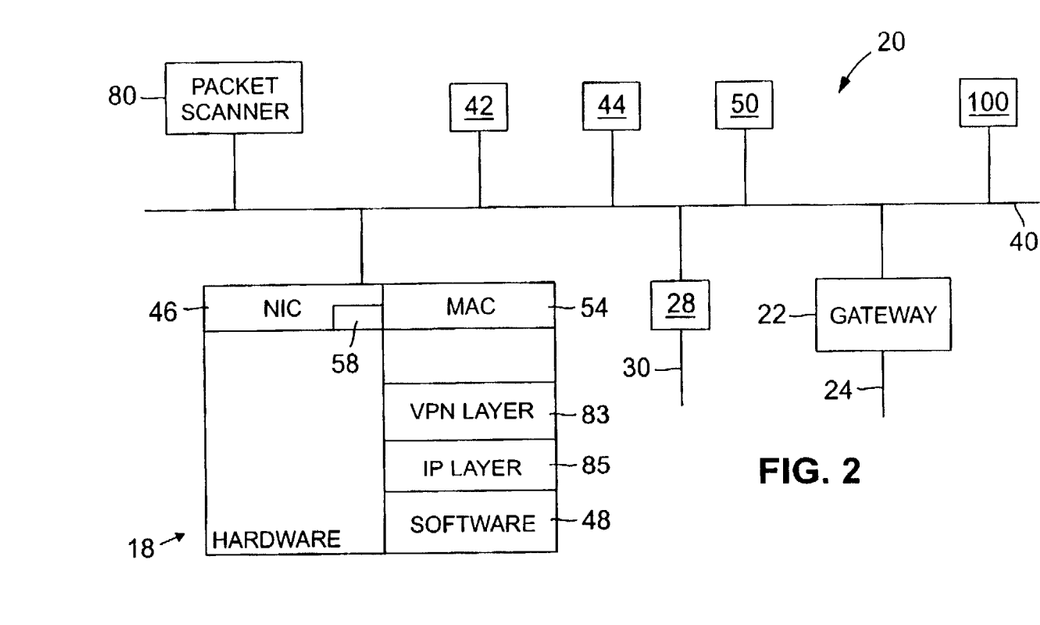

As seen in FIG. 2, internal LAN 20 includes a physical communication medium 40 (such as twisted pair wiring, optical fibers, or coaxial cable) that interconnects workstations 18, 42, 44. In each workstation 18, the interconnection is made via a network interface card (NIC) 46. Operating system software 48, such as Microsoft Windows NT®, running on the workstation and in a network server 50 implements network packet communication.

The network software is layered. The lowest layer, medium access control (MAC) 54, manages the operation of the NIC to achieve the communication of physical bits on the communication medium. The NIC in each workstation has a hardware address 58 that is unique at least among the devices connected in the internal LAN. The hardware address may be set manually using physical switches or manually or automatically using software switches. As seen in FIG. 3, the hardware address may be used as a hardware destination address 72 or a hardware source address 70 within a packet.

The packet also includes a network layer source address 74 and destination address 76 (for example, IP addresses). An IP address is a logical address which specifies a device whether or not located on the internal LAN. An IP address may be of the form 206.8.142.10 where the higher order elements (e.g., 206.8.142) of the address hierarchically and globally identify the address of the LAN, and the lower order elements of the address (0.10) identifies a particular device on the LAN. A network mask (e.g., 255.255.255.0) may be provided for masking the address, leaving only the elements that identify a network. This enables a determination whether a particular addressed device (e.g., 0.10) is part of a particular addressed network (e.g., 206.8.142).

Referring again to FIG. 2, to identify packets which may be passing via a back door 28, a packet scanner 80 is connected to the internal LAN medium 40. The packet scanner may be implemented as a workstation similar to the other workstations on the LAN but with additional software to perform the scanning operations.

Figure 4:
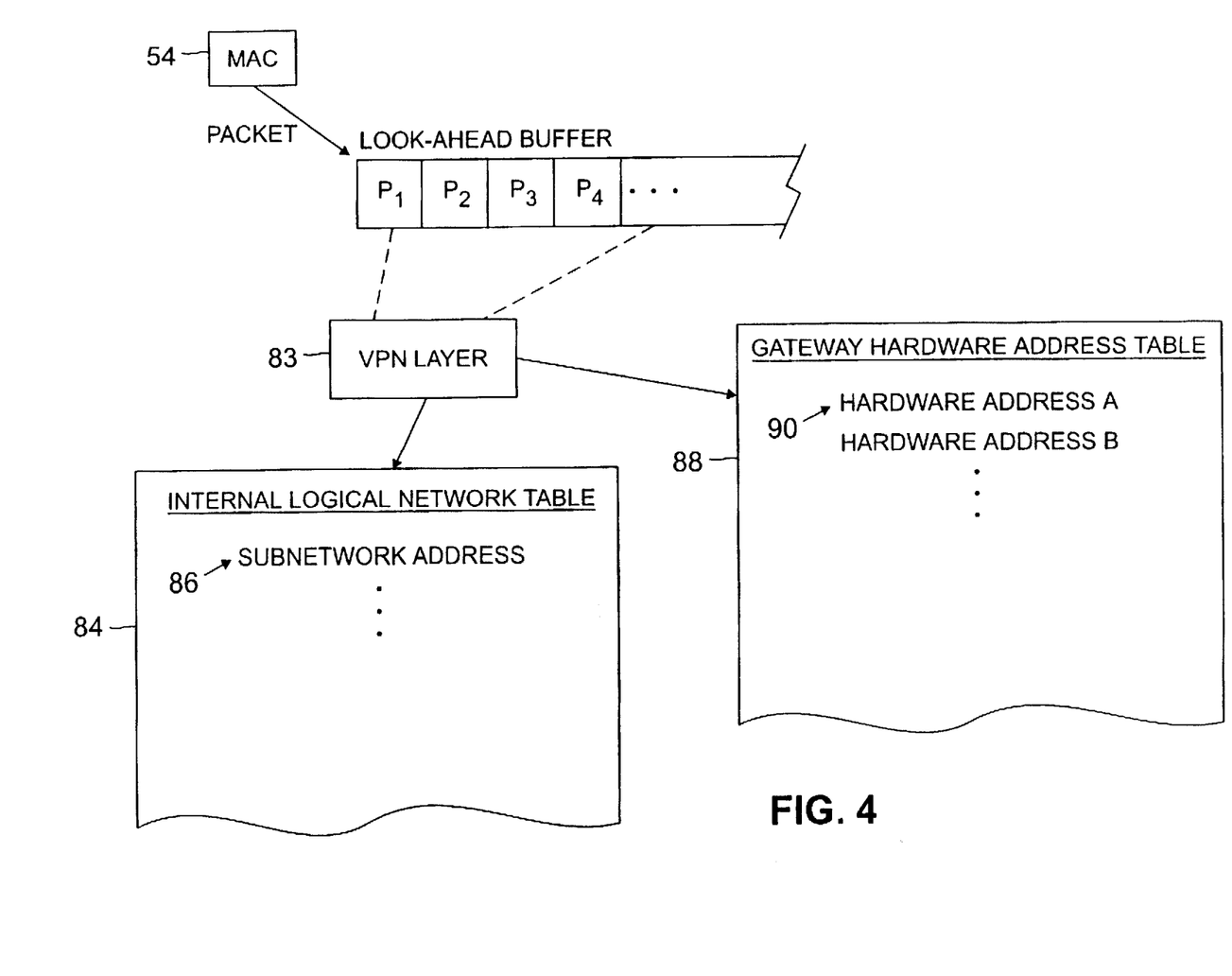
FIG. 4 is a block diagram of a portion of a packet scanner.

Referring to FIG. 4, during scanning operations, the MAC of the packet server operates in a so-called promiscuous listening mode in which it places, in a FIFO look-ahead buffer, every packet P1, P2, . . . that appears on the network medium. The look-ahead FIFO buffer is provided by the MAC layer to make incoming packets available to the layer above it.

A layer of software 83 (called the VPN layer and discussed in Alan J. Kirby et al., U.S. patent application Ser. No. 08/585,765, filed on Jan. 16, 1995 now abandoned in favor of Ser. No. 08/946,941 filed on Oct. 9, 1997) looks, in turn, at each of the packets in the look-ahead buffer on a FIFO basis.

The VPN software layer maintains two tables. One table 84 holds a list of subnetwork addresses 86 (e.g., 8.142) which represent internal logical networks which are served by the physical network medium to which the packet scanner is connected. Note that, although each of the devices that is physically connected to the physical network medium 40 (FIG. 2) has a unique hardware address, the devices may be grouped logically into internal logical networks each of which may include a subset of all of the physical devices. A second table 88 lists the hardware addresses 90 of only authorized gateways connected to the physical network medium.

Figure 5:
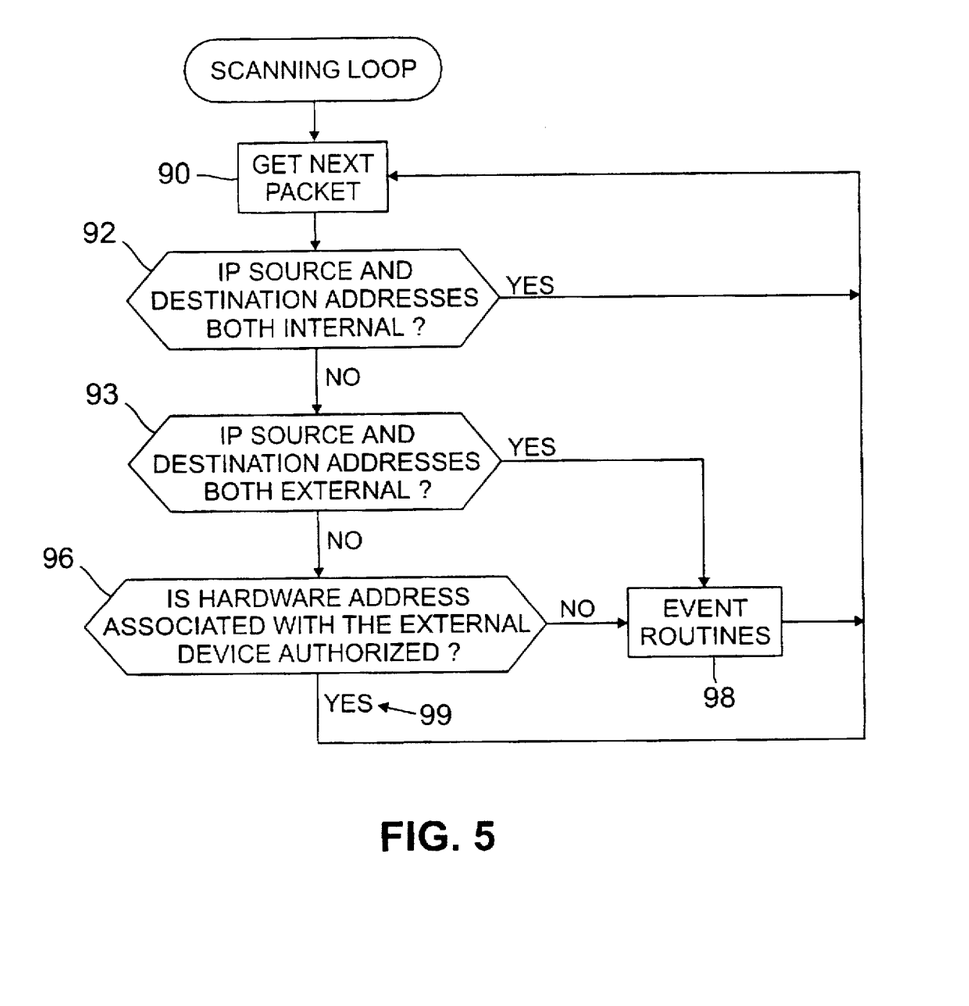
FIG. 5 is a flow diagram.

As seen in FIG. 5, during the scanning loop, after getting (90) the next packet from the look-ahead buffer, the VPN layer compares (92) the source and destination IP addresses with subnetwork addresses in table 86 to determine if the packet is one that both came from and is intended for devices which are within one of the internal networks. If so, it is assumed that the packet did not pass via a back door and the packet is disregarded for further purposes of the scanning loop. Then the next packet is fetched from the buffer If neither of the source or destination IP addresses are associated with internal networks (93), the packet should not be passing on that subnetwork and an event is logged.

Otherwise, one and only one of the IP addresses must be of a device not associated with the internal networks; which one has already been determined in steps 92 and 93. For the IP address of the device that is not associated with the internal networks, the VPN layer compares (96) the corresponding hardware address with hardware addresses held in table 88 to determine if the packet came from or is intended for (depending on the particular case) a device that is one of the authorized gateways. If the address is in the table (result of the test is "yes" 99), then the packet is assumed not to have passed via a back door.

Otherwise, if the hardware address does not match any of the hardware addresses in the gateway table, it is assumed that it passed or is going to pass via a back door. The VPN layer then performs (98) one or more event routines associated with this occurrence before proceeding to fetch the next packet.

The routines may include logging information about the destination and source devices and the content of the packet, the time on which the event occurred, and a variety of other information. The information may be sent to another process or device using an SNMP (simple network management protocol) message or other mechanisms.

Even though the hardware address of the backdoor may be determined and reported using the method described above, it may be cumbersome for the LAN administrator to use this information because the hardware addresses of the devices connected to the network medium may not be known. To simplify the administrator's work, a reverse address resolution protocol (RARP) server 100 (FIG. 2) may be used. The RARP server includes a table that permits it automatically to translate hardware network addresses to IP addresses which are typically well known by the administrator. One of the event routines 98 may be to send the hardware address of the back door to the RARP server for resolution into the corresponding IP address.

Similarly, building up table 88 may be a cumbersome job for the administrator who may not know the hardware addresses of the devices connected to the network medium. The table could be built dynamically using an ARP protocol on IP addresses.

An example of code which implements a packet scanner is set forth in Appendix A.

Other embodiments are within the scope of the following claims. For example, the network protocol need not be IP.

The determination of whether or not a packet is involved in an off-network communication need not be based on analysis of IP addresses in the packet. In the case of a routing protocol (such as RIP), the packet scanner could watch for packets indicating that a non-authorized router on its network is advertising routes. In the case of a protocol (such as ICMP), the packet scanner could watch for a "redirect" message which may be sent to force a redirection of a message to an unauthorized gateway.

```
/*++                          APPENDIX A

Copyright (c) 1996 Raptor Systems, Inc.  All rights reserved.

Permission to copy, modify, distribute, or sell this software or its
documentation for any purpose is hereby denied without specific, written
prior permission from Raptor Systems Incorporated.

Raptor Systems Incorporated disclaims all warranties with regard to this
software, including all implied warranties of merchantability and fitness,
in no event shall Raptor Systems Incorporated be liable for any special,
indirect or consequential damages or any damages whatsoever resulting from
loss of use, data or profits, whether in an action of contract, negligence
or other tortious action, arising out of or in connection with the use or
performance of this software.

Scan.c

Abstract:

Detecting Unauthorized Network Communications

This file contains SAMPLE CODE...
                associated with the implementation of the promiscuous mode
                WAN/Scan interface portion of the NT Firewall driver.

This version only scans for IP-based "back-doors"

--*/ include "scan.h"       /* macros, definitions, prototypes... */ static const IPADDRESS  BroadcastAddress = 0xFFFFFFFFUL;

/*
 *      Begin code section.
 */

//*********************************************************************
/*
 *      VpnScan is the entry-point from the code in our driver which is
 *      given the the look-ahead buffers from the lower (MAC) layer
 */
UINT
VpnScan (
        IN PVPN_ADAPTER         Adapter,
        IN NDIS_MEDIUM          MediaInUse,
        IN PVOID                Data,
        IN UINT                 DataLength
)
{
        NDIS_STATUS             Status;
        PETHERNET_HEADER        EnetHeader;
        PIP_HEADER              IpHeader;
        IPADDRESS               IpDstAddress;
        USHORT                  EnetProtocol;
```

```
        UINT                    IpHeaderLength;
        UINT                    result;

const NDIS_PHYSICAL_ADDRESSH_Acceptable = NDIS_PHYSICAL_ADDRESS_CONST(-1,-1)

VPNDBG(VpnDbgIpSec, DbgPrint ("VPN: -->VpnScan \n"); )

result = SCAN_KEEP;             /* lets assume we want to keep it */ switch (MediaInUse) { case NdisMedium802_3 :

EnetHeader   = (PETHERNET_HEADER) Data;
                EnetProtocol = *((PUSHORT)(&EnetHeader->EthProtocolType[0]));
                break;

case NdisMedium802_5 :
                //
                // In our receive code we built a contiguous buffer so we can
                // pass the sum of the header and data to other functions.
                //
                EnetProtocol = VpnTrFrameEtherType ( Data, DataLength);
                break;

default :

ASSERT(FALSE);
                goto Done;

}       // End switch (MediaInUse)

if (ETHER_ARP_PROTOCOL == EnetProtocol) {
        //
        // Pass along ARP requests.
        //
        goto Done;
        } if (ETHER_IP_PROTOCOL != EnetProtocol) {
        //
        //  Don't handle anything but IP from here.
        //
        goto Done;
    } if ( DataLength < MIN_SCAN_DATA_LENGTH ) {
                //
                // Don't have enough data to work with so don't attempt to do
                // anything with this frame.
                //
                result = SCAN_DROP;
                goto Done;
        } switch (MediaInUse) {
```

```
      case NdisMedium802_3 :

IpHeader = (PIP_HEADER)(((PUCHAR)Data)+sizeof(ETHERNET_HEADER)
          break;

case NdisMedium802_5 :

//
          // In our receive code we built a contiguous buffer so we can
          // pass the sum of the header and data to other functions.
          //
          IpHeader = VpnTrFrameIpOffset ( Data, DataLength);
          if (NULL == IpHeader) {
                  goto Done;
          }
          break;

default :

ASSERT(FALSE);
          goto Done;
}     // End switch (MediaInUse)

/* get IP header length, using macro */
IpHeaderLength =
        (UINT) IP_HEADER_LENGTH(IpHeader->IpVersionAndHeaderLength);
//
//      Check for valid IP Header Length, must be at least 20 bytes.
//
if ( IpHeaderLength < sizeof(IP_HEADER) ) {
        result = SCAN_DROP;
        goto Done;
}

//
// Determine if this IP packet is to be scanned
//
if (result = vpn_packet_is_routing_protocol((unsigned char*)IpHeader))
        unsigned char*  dptr;
        dptr = (unsigned char*)Data;            /* point to mac */
        dptr += 6;                              /* point to src addr */ if ( vpn_packet_via_badguy( dptr)) {    /* check src mac addr
                /*
                 *      src address is not authorized gateway!
                 */
                int             i;              /* loop var */
                struct ipv4*    ip;
                unsigned char   mac[6];
                unsigned char   src[4];
                unsigned char   dst[4];

/* build mac logging buffer */
                for (i=0; i<6; i++)
                        mac[i] = *dptr++;

/* build ip logging buffer */
                ip = (struct ipv4*)IpHeader;
                dptr = (unsigned char*)&ip->ip_src;    /* pt to IP src */
```

```
                for (i=0; i<4; i++) {
                        src[i] = *dptr;
                        dst[i] = *(dptr+4);
                        dptr++;
                }

/* log something */
                VPNDBG( VpnDbgScanAlert, DbgPrint (
        "%s %d.%d.%d.%d->%d.%d.%d.%d %s %x:%x:%x:%x:%x:%x\n",
        "SCAN: ALERT 3 - packet ",
        src[0], src[1], src[2], src[3],
        dst[0], dst[1], dst[2], dst[3],
        "routing protocol by unauthorized gateway ",
        mac[0], mac[1], mac[2], mac[3], mac[4], mac[5]
        ); )

/*
                 * pass packet to event logger for
                 * application layer reporting
                 */
                save_packet_for_reporting( Data);

}
}
//
// Determine if this IP packet is to be scanned
//
if (result = vpn_packet_off_protected_net((unsigned char*)IpHeader) )

unsigned char*  dptr;
        dptr = (unsigned char*)Data;            /* point to mac */ if ( (SRC_SUSPECT | DST_SUSPECT) == result) {
                int             i;              /* loop var */
                struct ipv4*    ip;
                unsigned char   smac[6];
                unsigned char   dmac[6];
                unsigned char   src[4];
                unsigned char   dst[4];

/* log something */
                VPNDBG( VpnDbgScanAlert, DbgPrint (
                "SCAN: ALERT 2 - both IP addresses are external!\n");

if ( vpn_packet_via_badguy( (dptr+6)) ) {
                        VPNDBG( VpnDbgScanAlert, DbgPrint (
                        "SCAN: ALERT 2 -src MAC unauthorized gateway\n
                        ); )
                }
                if ( vpn_packet_via_badguy( (dptr)) ) {
                        VPNDBG( VpnDbgScanAlert, DbgPrint (
                        "SCAN: ALERT 2 - dst MAC unauthorized gateway\1
                        ); )
                }

/*
                 * pass packet to event logger for
                 * application layer reporting
                 */
                save_packet_for_reporting( Data);
```

```
        /* build mac logging buffer */
        for (i=0; i<6; i++) {
                dmac[i] = *dptr;
                smac[i] = *(dptr+6);
                dptr++;
        }

/* build ip logging buffer */
        ip = (struct ipv4*)IpHeader;
        dptr = (unsigned char*)&ip->ip_src; /* pt to IP src */
        for (i=0; i<4; i++) {
                src[i] = *dptr;
                dst[i] = *(dptr+4);
                dptr++;
        }

/* log something */
        VPNDBG( VpnDbgScanAlert, DbgPrint (
"%s %d.%d.%d.%d->%d.%d.%d.%d (%x:%x:%x:%x:%x:%x->%x:%x:%x:%x:%x:%x)\n"
"SCAN: ALERT 2 - packet ",
src[0], src[1], src[2], src[3],
dst[0], dst[1], dst[2], dst[3],
smac[0], smac[1], smac[2], smac[3], smac[4], smac[5],
dmac[0], dmac[1], dmac[2], dmac[3], dmac[4], dmac[5]
                ); )

/*
         * pass packet to event logger for
         * application layer reporting
         */
        save_packet_for_reporting( Data );

goto cleanup;
} if (result == SRC_SUSPECT)
        dptr += 6;

if ( vpn_packet_via_badguy( dptr) ) {
        /*
         *      address is not authorized gateway!
         */
        int             i;              /* loop var */
        struct ipv4*    ip;
        unsigned char   mac[6];
        unsigned char   src[4];
        unsigned char   dst[4];

/* build mac logging buffer */
        for (i=0; i<6; i++)
                mac[i] = *dptr++;

/* build ip logging buffer */
        ip = (struct ipv4*)IpHeader;
        dptr = (unsigned char*)&ip->ip_src; /* pt to IP src */
        for (i=0; i<4; i++) {
                src[i] = *dptr;
                dst[i] = *(dptr+4);
                dptr++;
```

```
                }
                /* log something */
                VPNDBG( VpnDbgScanAlert, DbgPrint (
        "%s %d.%d.%d.%d->%d.%d.%d.%d %s %x:%x:%x:%x:%x:%x\n",
        "SCAN: ALERT 1 - packet ",
        src[0], src[1], src[2], src[3],
        dst[0], dst[1], dst[2], dst[3],
        "via unauthorized gateway ",
        mac[0], mac[1], mac[2], mac[3], mac[4], mac[5]
        ); )

/*
                 * pass packet to event logger for
                 * application layer reporting
                 */
                save_packet_for_reporting( Data);
            }
        } cleanup:

//
        //     if packet not for me or bcast, drop it
        //
        IpDstAddress = *((PIPADDRESS)(&IpHeader->IpDstAddress[0]));

//
        // If this IP packet is addressed to this gateway then pass it up.
        // NOTE: We don't check the IP checksum here because we want the IP
        // NOTE: statistics to catch this error.
        //
        if ( IpDstAddress == Adapter->IpAddress)  {
                //
                //      IP Addressed to this station so pass it up...
                //
                goto Done;
        } if ( IpDstAddress == BroadcastAddress)  {
                //
                //      IP Broadcast so pass it up...
                //
                goto Done;
        }

/*
         *   else it isn't for me, so drop packet...
         */
        result = SCAN_DROP;

Done:

VPNDBG(VpnDbgIpSec, DbgPrint ("VPN: <--VpnScan \n"); )

return result;

}       // End VpnScan
```

```c
//*************************************************************************

/*
 *      global anchors for lookup tables
 */ struct scan_net*        net_db_head = NULL;
struct scan_gate*       gate_db_head = NULL;

/*************************************************************************/
/*
 *      For SAMPLE code, simple hard-coding 1 authorized gateway
 *      and 1 protected internal network
 */
void *
VpnScanInit()
{
        NDIS_STATUS                     status;
        unsigned char*                  new_data;
        struct scan_net*                my_net;
        struct scan_gate*               my_gate;
        unsigned int                    size;

const NDIS_PHYSICAL_ADDRESS H_Acceptable = NDIS_PHYSICAL_ADDRESS_CONST(-1,-1

VPNDBG(VpnDbgIpSec, DbgPrint ("VPN: -->VpnScanInit\n"); )

/*
        **
        **
        **              build internal network database
        **
        */
        size = sizeof( *my_net);
        status = NdisAllocateMemory (   &new_data,
                                        (unsigned int)size,
                                        0,
                                        H_Acceptable
                                        );

if (NDIS_STATUS_SUCCESS != status) {
            VPNDBG(VpnDbgScan, DbgPrint ("VPN: Memory ALLOC Failed (tunnel)\n"
            return 0;
        }

/*
         *     setup main tunnel structure
         */
        my_net = (struct scan_net*)new_data;
        my_net->prev = NULL;
        my_net->next = NULL;
        my_net->net = htonl(0x01020300);        /* internal net 1.2.3.0 */
        my_net->mask = htonl(0xffffff00);

/*
```

```
 *      Link it into database
 */
net_db_head = my_net;

/*
**
**              build allowed Gateway database
**
*/
size = sizeof( *my_gate);
status = NdisAllocateMemory (    &new_data,
                                 (unsigned int)size,
                                 0,
                                 H_Acceptable
                                 );

if (NDIS_STATUS_SUCCESS != status) {
    VPNDBG(VpnDbgScan, DbgPrint ("VPN: Memory ALLOC Failed (tunnel)\n");
    return 0;
}

/*
 *      setup main tunnel structure
 */
my_gate = (struct scan_gate*)new_data;
my_gate->prev = NULL;
my_gate->next = NULL;

my_gate->ip_addr = htonl(0x04050607);    /* address 4.5.6.7 */ my_gate->mac_addr[0] = 0x08;
my_gate->mac_addr[1] = 0x00;
my_gate->mac_addr[2] = 0x20;
my_gate->mac_addr[3] = 0x01;
my_gate->mac_addr[4] = 0x02;
my_gate->mac_addr[5] = 0x03;

/*
 *      Link it into database
 */
gate_db_head = my_gate;

VPNDBG(VpnDbgIpSec, DbgPrint ("VPN: <--VpnScanInit\n"); )

return 0;
} int
vpn_packet_is_routing_protocol( packet )
unsigned char* packet;
{
    struct ipv4*     ip;
    unsigned char    next_proto;
    int              result;

VPNDBG(VpnDbgIpSec,
        DbgPrint ("VPN: -->vpn_packet_is_routing_protocol\n"); )
```

```
        /*
         * retrieve next protocol from packet
         */
        ip = (struct ipv4*)packet;
        next_proto = ip->ip_p;

/*
         * SAMPLE
         * list of routing protocols you want to flag for attention
         * add protocols as desired...
         *
         * note: if you want to scan for RIP, scan for appropriate UDP traffic.
         *       if you want to scan for BGP, scan for appropriate TCP traffic.
         *       ...
         */
        if (next_proto == IPPROTO_GGP) {        /* (3) Gateway-to-Gateway */
            result = 1;                          /* ALERT (maybe), match on scan */
        }
        else if (next_proto == IPPROTO_EGP) {   /* (8) Exterior Gateway Protocol *
            result = 1;                          /* ALERT (maybe), match on scan */
        }
        else if (next_proto == IPPROTO_IGP) {   /* (9) private Interior Gateway */
            result = 1;                          /* ALERT (maybe), match on scan */
        }
        else {
            result = 0;                          /* OK, no match on this scan */
        }

VPNDBG(VpnDbgIpSec,
            DbgPrint ("VPN: <--vpn_packet_is_routing_protocol\n"); )

return( result);
} int
vpn_packet_off_protected_net( packet )
unsigned char* packet;
{
        struct ipv4*    ip;
        unsigned long   dst;            /* Destination address - host order*/
        unsigned long   src;            /* Source address - host order */
        int             src_stat;
        int             dst_stat;
        int             result;
        struct scan_net* net;

VPNDBG(VpnDbgIpSec,
            DbgPrint ("VPN: -->vpn_packet_off_protected_net\n"); )

/*
         * assume the worst
         */
        src_stat = SRC_SUSPECT;
        dst_stat = DST_SUSPECT;
        result = SRC_SUSPECT | DST_SUSPECT;

/*
         * retrieve addresses from packet
```

```
        */
    ip = (struct ipv4*)packet;
    dst = ip->ip_dst;
    src = ip->ip_src;

for (net = net_db_head; net ; net = net->next)
    {
        if ((src == 0x00000000) || (src == 0xffffffff))
                src_stat = OK;
        if ((dst == 0x00000000) || (dst == 0xffffffff))
                dst_stat = OK;
        if ( net->net == (src & net->mask))
                src_stat = OK;
        if ( net->net == (dst & net->mask))
                dst_stat = OK;
        result = src_stat | dst_stat;

if ( 0 == result)
                goto done;
    }
done:

VPNDBG(VpnDbgIpSec,
            DbgPrint ("VPN: <--vpn_packet_off_protected_net\n"); )

return result;

} vpn_packet_via_badguy( mac )
unsigned char* mac;
{
    struct scan_gate*   gate;
    unsigned char*      gateway;
    int                 result;

VPNDBG(VpnDbgIpSec,
            DbgPrint ("VPN: -->vpn_packet_via_badguy\n"); )

result = 1;         /* assume badguy */
    for (gate = gate_db_head; gate ; gate = gate->next) {
        gateway = (unsigned char*)&gate->mac_addr[0];
        if (    ( *(unsigned short*)(gateway) == *(unsigned short*)(mac)) &&
                ( *(unsigned short*)(gateway+2) == *(unsigned short*)(mac+2))
                ( *(unsigned short*)(gateway+4) == *(unsigned short*)(mac+4)))
                result = 0;   /* found a registered gateway, so he is OK */
                goto done;
            }
    }
done:

VPNDBG(VpnDbgIpSec, DbgPrint ("VPN: <--vpn_packet_via_badguy\n"); )

return( result );                        /* not found, must be a badguy... */
}
```

What is claimed is:

1. A method for use with devices that are coupled by a communication medium to form an internal packet network, at least one of the devices not being an authorized conduit for communication with external devices that are not part of the internal packet network, the method comprising observing packets passing on the medium, based on the observation, detecting packets that pass between the internal packet network and one of the external devices via one of the devices that is part of the internal network, and for detected packets associated with communication with the external device, determining if the one device via which the packets pass is an authorized conduit for communication with external devices.

2. The method of claim 1 in which the detecting comprises comparing address information in the packets with address information associated with devices that are part of the internal packet network to determine if the packet involves communication only between devices that are part of the internal packet network.

3. The method of claim 2 in which the address information comprises logical network addresses.

4. The method of claim 2 in which the logical network addresses comprise IP addresses.

5. The method of claim 2 further comprising storing the address information associated with devices that are part of the internal packet network in a look-up table.

6. The method of claim 1 in which the determining comprises examining hardware addresses in the packets.

7. The method of claim 6 in which the hardware addresses comprise unique hardware addresses of network interface cards in the devices.

8. The method of claim 1 further comprising comparing address information in the packets with address information associated with the devices that are authorized conduits for communication with external devices.

9. The method of claim 8 further comprising storing the address information associated with the devices that are authorized conduits in a look-up table.

10. The method of claim 1 in which at least one of the devices of the internal packet network is an authorized conduit for communication with external devices that are not part of the internal packet network.

11. The method of claim 1 further comprising storing packets temporarily in a look-ahead buffer.

12. The method of claim 1 further comprising reporting information about the non-authorized communication.

13. A method for reducing back door packet communication between a device on a network that is not an authorized conduit for communication with external devices that are outside of the network and a device outside the network comprising detecting packets that pass between the network and the device outside the network via the device on the network, and identifying packets among the detected packets that are sent or received by the device on the network that is not authorized for communication with devices outside the network.

14. Apparatus for use in reducing packet communication between a device on a network that is not an authorized conduit for communication with devices outside the network and a device outside the network comprising a scanner connected to observe packets passing on the network, and an analyzer that determines if one of the packets includes address information indicating that communication is occurring with the device that is not an authorized conduit for communication with devices outside the network and the external device.

15. A method for use with devices that are coupled by a communication medium to form an internal packet network, none of the devices being an authorized conduit for communication with external devices that are not part of the internal packet network, the method comprising observing network address information in packets passing on the medium, based on the observed network address information, detecting packets intended to pass from the internal packet network to the external device via one of the devices that is part of the internal packet network, and raising an alarm with respect to packets intended for communication with an external device.

16. The method of claim 1 in which the determining comprises watching for packets indicating that a non-authorized device is advertising routes.

17. The method of claim 1 in which the determining comprises watching for redirect messages being sent by a non-authorized device to redirect traffic to an unauthorized gateway.

18. A method for use with devices that are coupled by a communication medium to form an internal message network, at least one of the devices not being an authorized conduit for communication with external devices that are not part of the internal message network, the method comprising observing messages passing on the medium, based on the observation, detecting messages that pass between the internal packet network and one of the external devices via one of the devices that is part of the internal packet network, and for detected messages associated with communication with the external device, determining if the one device via which the packets pass is an authorized conduit for communication with external devices.

19. A method for use with devices that are coupled by a communication medium to form an internal packet network, at least one of the devices not being an authorized conduit for communication with external devices that are not part of the internal packet network, the method comprising observing packets passing on the medium, based on the observation, detecting packets that pass between the internal packet network and one of the external devices via one of the devices that is part of the internal network by comparing the IP addresses of the packets with the IP addresses of devices on the internal packet network, for detected packets associated with communication with the external device, determining if the one device via which the packets pass is an authorized conduit for communication with external devices by comparing the hardware addresses of the packets with hardware addresses that correspond to devices that are authorized conduits, and for packets whose hardware addresses do not correspond to devices that are authorized conduits, reporting information about the non-authorized communication.

* * * * *